United States Patent
Jung

(10) Patent No.: US 10,087,819 B2
(45) Date of Patent: Oct. 2, 2018

(54) APPARATUS AND METHOD FOR SUPPLYING COOLANT IN THROTTLE BODY

(71) Applicant: HYUNDAI MOTOR COMPANY, Seoul (KR)

(72) Inventor: Tack Su Jung, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 142 days.

(21) Appl. No.: 15/208,205

(22) Filed: Jul. 12, 2016

(65) Prior Publication Data

US 2017/0122187 A1 May 4, 2017

(30) Foreign Application Priority Data

Oct. 28, 2015 (KR) .................. 10-2015-0149948

(51) Int. Cl.
*F02M 31/12* (2006.01)
*F02B 29/04* (2006.01)

(52) U.S. Cl.
CPC ...... *F02B 29/0443* (2013.01); *F02B 29/0493* (2013.01)

(58) Field of Classification Search
CPC .............. F02B 29/0443; F02B 29/0493
USPC .................................. 123/556, 542
See application file for complete search history.

(56) References Cited

U.S. PATENT DOCUMENTS

| 4,572,128 A * | 2/1986 | Okamoto ............... F02M 3/06 123/339.24 |
| 6,186,127 B1 * | 2/2001 | Everingham .......... F02M 26/73 123/568.12 |
| 9,145,858 B2 * | 9/2015 | Maceroni et al. ........................... F02M 35/10255 |
| 2001/0013332 A1 * | 8/2001 | Torii ..................... F02M 15/02 123/337 |
| 2004/0187805 A1 * | 9/2004 | Arisawa ................. F01P 7/162 123/41.14 |
| 2009/0194078 A1 * | 8/2009 | Miyazaki ............... F02D 9/104 123/549 |
| 2012/0074238 A1 * | 3/2012 | Morita ................ F02D 13/0249 237/5 |

FOREIGN PATENT DOCUMENTS

| JP | H06-17718 A | 1/1994 |
| JP | 2000-046213 A | 2/2000 |
| JP | 2008-106707 A | 5/2008 |
| JP | 2011-179475 A | 9/2011 |
| JP | 2012-047102 A | 3/2012 |
| JP | 2013-113129 A | 6/2013 |

(Continued)

*Primary Examiner* — Marguerite McMahon
(74) *Attorney, Agent, or Firm* — McDermott Will & Emery LLP

(57) ABSTRACT

An apparatus for supplying a coolant in a throttle body includes a heating adaptor having a coolant passage therein in which coolant supplied thereto is circulated and discharged, a passage switching valve movably installed in a coupling hole provided at an inlet of the heating adaptor, and having a bypass passage in which the coolant circulated along the coolant passage is selectively blocked, and a drive unit connected to the passage switching valve for sliding the passage switching valve so that the coolant supplied to the heating adaptor is discharged along the bypass passage.

5 Claims, 4 Drawing Sheets

(56) References Cited

FOREIGN PATENT DOCUMENTS

| KR | 10-1997-0044493 A | 7/1997 |
| KR | 20-1999-026508 U | 7/1999 |
| KR | 10-2002-0075290 A | 10/2002 |
| KR | 10-2010-0107650 A | 10/2010 |
| KR | 10-2013-0030147 A | 3/2013 |

\* cited by examiner

APPARATUS AND METHOD FOR SUPPLYING COOLANT IN THROTTLE BODY

CROSS-REFERENCE TO RELATED APPLICATION

This application claims under 35 U.S.C. § 119(a) the benefit of priority to Korean Patent Application No. 10-2015-0149948, filed on Oct. 28, 2015 with the Korean Intellectual Property Office, the entire contents of which are incorporated herein by reference.

TECHNICAL FIELD

The present disclosure relates to an apparatus and method for supplying coolant in a throttle body. More particularly, the present disclosure relates to an apparatus and method for supplying coolant in a throttle body, which is capable of preventing the temperature of intake air passing through a throttle body from being increased.

BACKGROUND

In general, a vehicle air suction system includes an air filter which filters foreign substances from intake air, a throttle body which has a throttle valve for regulating an amount of intake air, and a surge tank which has an intake manifold for distributing air to each cylinder of an engine.

In the air suction process using the air suction system, the intake air filtered by the air filter is introduced into the surge tank via the throttle body depending on whether or not the throttle valve is opened or closed. Subsequently, the intake air is distributed from the surge tank to the intake manifold communicating with each cylinder to be mixed with fuel injected from an injector, and then is introduced into the cylinder for combustion.

In addition, the throttle body includes a coolant passage for freeze prevention. That is, the throttle body has a structure for preventing freezing by supplying coolant, the temperature of which increases while passing through the coolant passage in the engine, to the throttle body such that the coolant is circulated in the coolant passage provided in the throttle body, and by increasing the temperature of the throttle body.

However, the throttle body having the coolant passage therein is supplied with coolant, the temperature of which is increased while passing through the coolant passage in the engine, even during warm weather even when there is no concern about freezing. Accordingly, the temperature of the throttle body increases. For this reason, the temperature of intake air passing through the throttle body may be increased.

That is, the conventional method for supplying coolant to the coolant passage in the throttle body may not prevent the temperature of intake air passing through the throttle body from being increased, which may lead to deterioration of the efficiency of the engine, such as an ignition timing delay, due to the increase in temperature of intake air.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

In one aspect, the present disclosure provides an apparatus and method for supplying coolant in a throttle body, which is capable of preventing an ignition timing from being delayed due to an increase in temperature of intake air passing through a throttle body, by supplying coolant to a coolant passage in the throttle body when the temperatures of coolant and intake air are equal to or lower than a predetermined reference temperature (i.e. the coolant temperature at the time when the inner surface temperature of the throttle body increases above zero), and by bypassing the supply of coolant thereto so as to block the supply of the coolant when the temperatures of coolant and intake air exceed the predetermined reference temperature.

In a preferred embodiment, an apparatus for supplying coolant in a throttle body includes a heating adaptor having a coolant passage therein in which coolant supplied thereto is circulated and discharged, a passage switching valve movably installed in a coupling hole provided at an inlet of the heating adaptor, and having a bypass passage in which the coolant circulated along the coolant passage is selectively blocked, and a drive unit connected to the passage switching valve, and sliding the passage switching valve so that the coolant supplied to the heating adaptor is discharged along the bypass passage.

The passage switching valve may include a coolant supply passage forming a circulation path in which the coolant supplied to the heating adaptor is circulated along the coolant passage in the heating adaptor, and a coolant discharge passage spaced apart from the coolant supply passage, and forming a discharge path in which the coolant circulated in the heating adaptor is discharged along the coolant passage.

A distance between an inlet and an outlet of the bypass passage may be equal to a distance between the coolant supply passage and the coolant discharge passage, and the bypass passage may allow the coolant supplied to the heating adaptor to be bypassed and discharged.

The bypass passage may pass through the coolant discharge passage and be installed such that an inlet and an outlet thereof are connected to each other, and the inlet and outlet of the bypass passage may be connected to the coolant passage when the passage switching valve slides.

The apparatus may further include a sealing member installed in a fastening groove formed in one end of the passage switching valve so as to offset a distance between an outer peripheral surface of the passage switching valve and an inner peripheral surface of the coupling hole.

In another preferred embodiment, a method for supplying coolant in a throttle body includes measuring a temperature of coolant by receiving a sensor signal from a first temperature sensor installed on a coolant passage in a heating adaptor, when an engine begins to be operated, measuring a temperature of intake air by receiving a sensor signal from a second temperature sensor, when the temperature of coolant is determined to be equal to or lower than a predetermined reference temperature, controlling opening of a passage switching valve for opening/closing the coolant passage in the heating adaptor, when the temperature of intake air is determined to be equal to or lower than the predetermined reference temperature, and transferring a signal indicative of the opening of the passage switching valve to a drive unit so that coolant is supplied to the coolant passage.

The measuring of a temperature of coolant may include controlling closing of the passage switching valve for opening/closing the coolant passage in the heating adaptor, when the temperature of coolant is determined to be equal to or higher than the predetermined reference temperature, and transferring a signal indicative of the closing of the passage switching valve to the drive unit so that the coolant supplied to the coolant passage is bypassed along a bypass passage in order to block supply of the coolant thereto.

The measuring of a temperature of intake air may include controlling closing of the passage switching valve for opening/closing the coolant passage in the heating adaptor, when the temperature of intake air is determined to be equal to or higher than the predetermined reference temperature, and transferring a signal indicative of the closing of the passage switching valve to the drive unit so that the coolant supplied to the coolant passage is bypassed along a bypass passage in order to block supply of the coolant thereto.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are presented hereinbelow by way of illustration only, and thus are not limitative of the present disclosure, and wherein.

Figure 1:
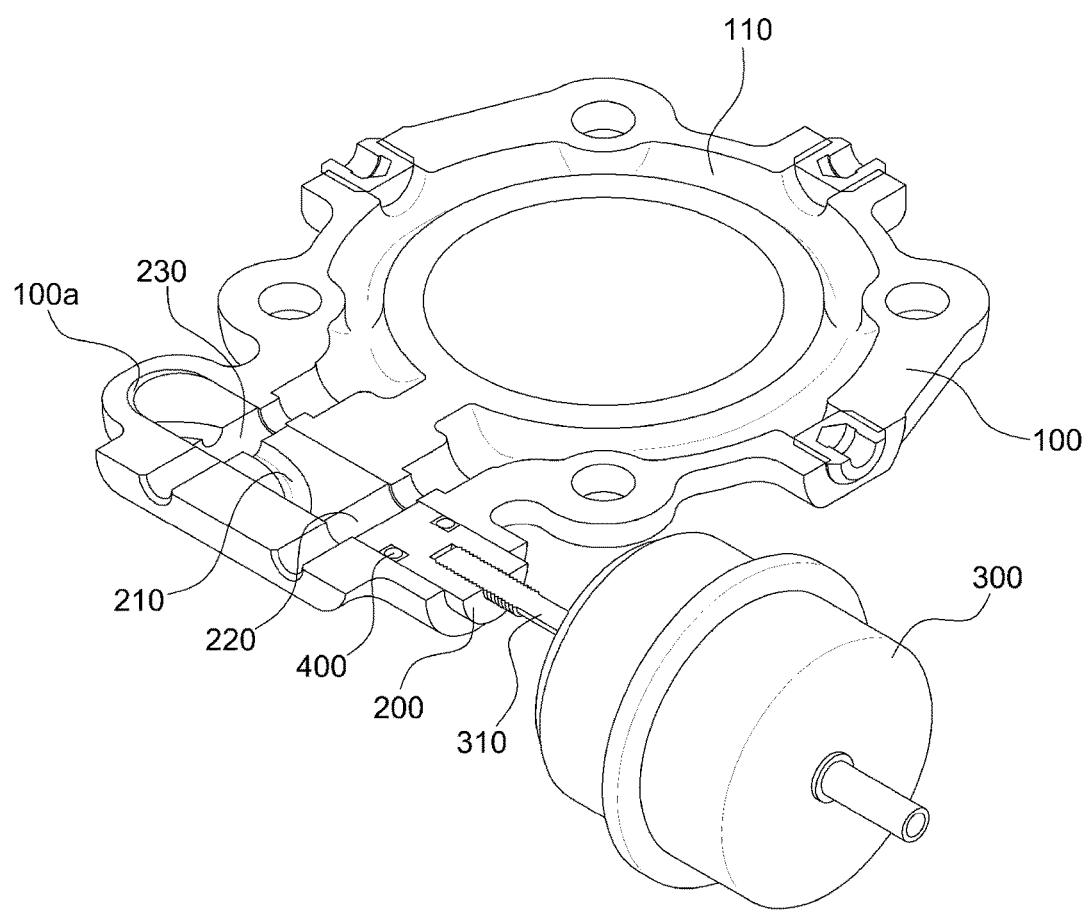
FIG. 1 is a view schematically illustrating an apparatus for supplying coolant in a throttle body according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 2:
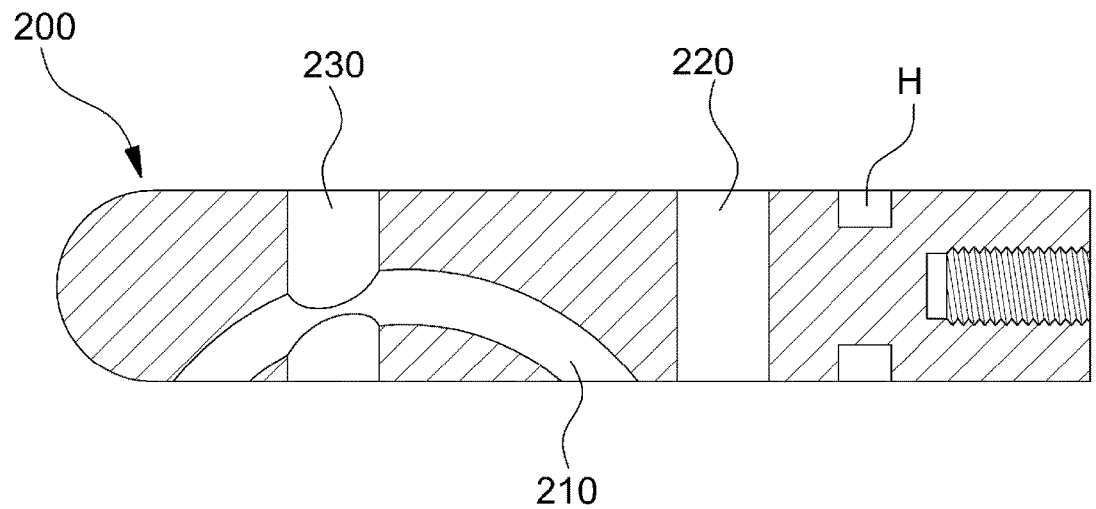
FIG. 2 is a view illustrating a passage switching valve of an apparatus for supplying coolant in a throttle body according to an embodiment of the present disclosure.

FIG. 1 is a view schematically illustrating an apparatus for supplying coolant in a throttle body according to an embodiment of the present disclosure. FIG. 2 is a view illustrating a passage switching valve of an apparatus for supplying coolant in a throttle body according to an embodiment of the present disclosure.

As illustrated in FIGS. 1 and 2, the apparatus for supplying coolant in a throttle body may include a heating adaptor 100, a passage switching valve 200 and a drive unit 300.

The heating adaptor 100 may be installed to a throttle body, and may include a coolant passage 110 therein. In the coolant passage 110, coolant, the temperature of which may be increased while passing through the coolant passage (not shown) in an engine, may be supplied to the inlet of the coolant passage 110 to be circulated therein, and may then be discharged therefrom.

That is, the heating adaptor 100 may prevent the throttle body from freezing in the case where there is a concern about freezing, as in the winter season, by circulating coolant, the temperature of which is increased while passing through the coolant passage of the engine, along the coolant passage 110 in the heating adaptor 100, and consequently increasing the temperature of the throttle body.

Since the heating adaptor 100 may be supplied with coolant, the temperature of which may be increased while passing through the coolant passage in the engine, even during warm weather when there is no concern about freezing, it may be impossible to prevent the temperature of intake air passing through the throttle body from being increased, which may lead to deterioration of the efficiency of the engine, such as an ignition timing delay, due to an increase in temperature of intake air.

To this end, the passage switching valve 200 may be movably installed in the coupling hole 100a provided at the inlet of the heating adaptor 100.

The passage switching valve 200 may include a bypass passage 210 in which coolant circulated along the coolant passage 110 in the heating adaptor 100 is selectively blocked.

The distance between the inlet and outlet of the bypass passage 210 may be equal to the distance between a coolant supply passage 220 and a coolant discharge passage 230 which will be described later. Accordingly, the coolant supplied to the inlet of the heating adaptor 100 may be bypassed and directly discharged to the outlet thereof without circulating in the heating adaptor 100.

The passage switching valve 200 may include the coolant supply passage 220 and the coolant discharge passage 230, as well as the bypass passage 210.

The coolant supply passage 220 may form a circulation path in which the coolant supplied to the heating adaptor 100 is circulated along the coolant passage 110 in the heating adaptor 100.

The coolant discharge passage 230 may be spaced apart from the coolant supply passage 220 on the passage switching valve 200, and may form a discharge path in which the coolant circulated in the heating adaptor 100 is discharged to the outlet of the heating adaptor 100 along the coolant passage 110.

Here, the bypass passage 210 may pass through the coolant discharge passage 230 and may be installed such that the inlet and outlet thereof are connected to each other. The bypass passage 210 may form a bypass path having a predetermined curvature, and the inlet and outlet of the bypass passage 210 may be connected to the coolant passage 110 when the passage switching valve 200 slides.

That is, when the passage switching valve 200 is closed, the inlet and outlet of the bypass passage 210 may be respectively connected to a coolant introduction part and a coolant discharge part which may form the coolant passage 110 in the heating adaptor 100. Thus, the coolant supplied to the coolant introduction part may be directly discharged through the coolant discharge part along the bypass path without circulating in the heating adaptor 100.

Accordingly, when the temperature of coolant measured by a temperature sensor (not shown) installed on the coolant passage 110 in the heating adaptor 100 and the temperature of intake air measured by an intake temperature sensor (not shown) are determined to be equal to or higher than a predetermined reference temperature (i.e. the coolant temperature at the time when the inner surface temperature of the throttle body increases above zero), the passage switching valve 200 may slide on the coupling hole 100a in order to bypass the coolant.

Thus, when the above condition is satisfied, the passage switching valve 200 may allow the coolant supplied to the coolant introduction part of the coolant passage 110 to be discharged to the coolant discharge part along the bypass passage 210. Consequently, it may be possible to prevent the temperature of intake air passing through the throttle body from being continually increased due to the temperature of the throttle body.

The drive unit 300 may be connected to the passage switching valve 200 by a rod 310 having a predetermined length, and may slide the passage switching valve 200 on the coupling hole 100a through the rectilinear motion of the rod 310 so that the coolant supplied to the heating adaptor 100 is discharged along the bypass passage 210.

Here, the drive unit 300 may serve to slide the passage switching valve 200, and may have various forms. For example, the drive unit 300 may be a hydraulic cylinder in which the rod 310 is rectilinearly reciprocated by hydraulic pressure, or may include a motor therein to electrically and rectilinearly reciprocate the rod 310 by the driving of the motor.

Meanwhile, the apparatus according to an embodiment may further include a sealing member 400.

The sealing member 400 may be an O-ring, and may be inserted and installed into a fastening groove H formed in one end of the passage switching valve 200 adjacent to the drive unit 300.

That is, the sealing member 400 may be formed by pushing an elastic ring having a circular cross-section into the fastening groove H, and may be deformed when it is pressurized, so as to offset the distance between the outer peripheral surface of the passage switching valve 200 and the coupling hole 100a.

The sealing member 400 may serve to block the coolant, which may remain in the bypass passage 210, the coolant supply passage 220, and the coolant discharge passage 230, from being discharged out of the coupling hole 100a when the passage switching valve 200 slides.

Figure 3:
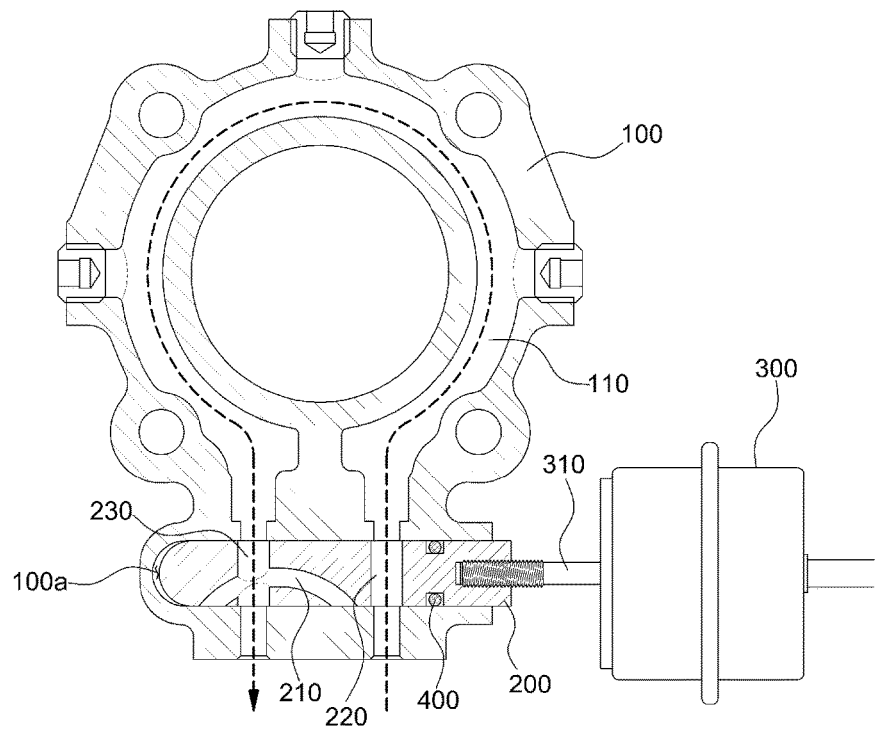
FIG. 3 is a view illustrating a state in which the passage switching valve is opened in an apparatus for supplying coolant in a throttle body according to an embodiment of the present disclosure.
Figure 4:
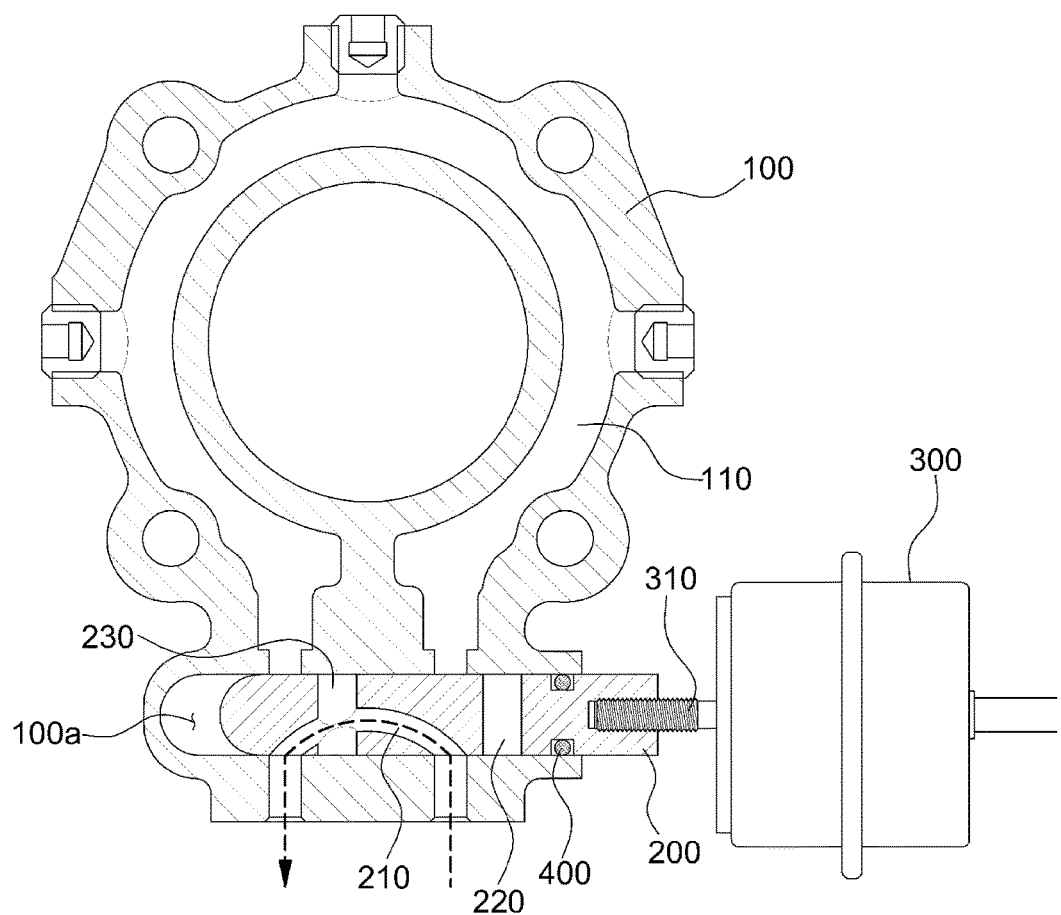
FIG. 4 is a view illustrating a state in which the passage switching valve is closed in an apparatus for supplying coolant in a throttle body according to the embodiment of the present disclosure.

FIG. 3 is a view illustrating a state in which a passage switching valve is opened in an apparatus for supplying coolant in a throttle body according to an embodiment of the present disclosure. FIG. 4 is a view illustrating a state in which a passage switching valve is closed in an apparatus for supplying coolant in a throttle body according to an embodiment of the present disclosure.

As illustrated in FIG. 3, the apparatus for supplying coolant in a throttle body may compare the temperature of coolant measured by the temperature sensor (not shown) installed on the coolant passage 110 in the heating adaptor 100 and the temperature of intake air measured by the intake temperature sensor (not shown) with a predetermined reference temperature (i.e. the coolant temperature at the time when the inner surface temperature of the throttle body increases above zero), so as to selectively open or close the passage switching valve 200.

When the measured temperature of coolant and the measured temperature of intake air introduced into the vehicle are determined to be equal to or lower than the predetermined reference temperature, the drive unit 300 may move the passage switching valve 200 such that the coolant supply passage 220 and the coolant discharge passage 230 coincide with the respective coolant introduction and discharge parts of the coolant passage 110.

Thus, since the passage switching valve according to an embodiment may allow the coolant introduced into the heating adaptor 100 to be circulated along the coolant passage 110 in the heating adaptor 100 and then discharged, the throttle body may be prevented from freezing in the case of winter season or other cold temperature situations.

Meanwhile, as illustrated in FIG. 4, an apparatus for supplying coolant in a throttle body may compare the temperature of coolant measured by the temperature sensor (not shown) installed on the coolant passage 110 in the heating adaptor 100 and the temperature of intake air measured by the intake temperature sensor (not shown) with a predetermined reference temperature. Consequently, when the temperatures of coolant and intake air are determined to be equal to or higher than the predetermined reference temperature, the passage switching valve 200 may be moved.

That is, when the above condition is satisfied, it may be determined that the coolant supplied to the heating adaptor 100 is not circulated along the coolant passage 110 in the heating adaptor 100. Consequently, the operation of the drive unit 300 may be controlled so that the passage switching valve 200 slides on the coupling hole 100a.

In other words, the drive unit 300 may slide the passage switching valve 200 by moving the rod 310 such that the inlet and outlet of the bypass passage 210 coincide with the respective coolant introduction and discharge parts of the coolant passage 110.

As a result, since the coolant introduced into the heating adaptor 100 may be directly discharged to the coolant discharge part along the bypass passage 210 without being circulated along the coolant passage 110 in the heating adaptor 100 in an embodiment, it may be possible to prevent the temperature of intake air passing through the throttle body from being continually increased due to the temperature of the throttle body.

In an embodiment, according to the comparison result of the temperatures of coolant and intake air with the predetermined reference temperature, the supply of coolant to the coolant passage 110 may be selectively blocked, and at the same time the coolant bypass valves may be realized as a single passage switching valve 200. Therefore, it is possible to minimize an increase in manufacturing cost.

Figure 5:
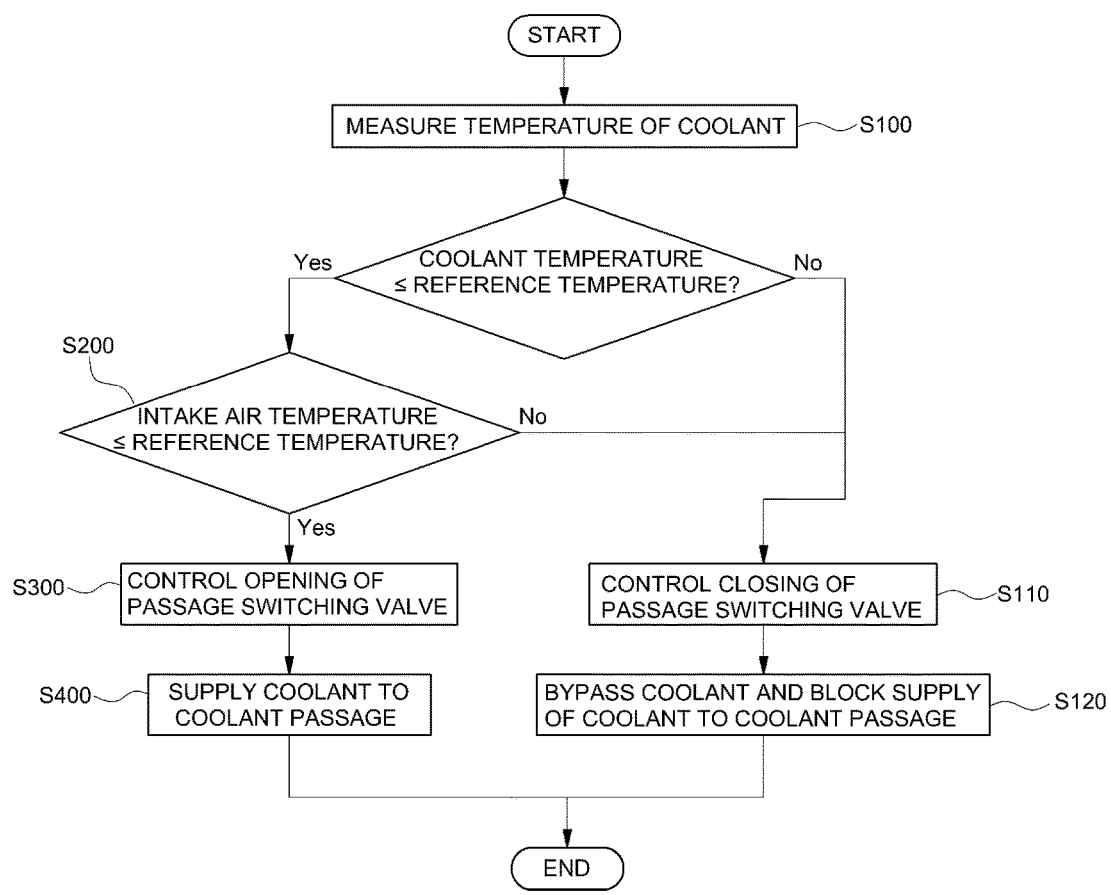
FIG. 5 is a flowchart illustrating a method for supplying coolant in a throttle body according to an embodiment of the present disclosure.

FIG. 5 is a flowchart illustrating a method for supplying coolant in a throttle body according to an embodiment of the present disclosure.

As illustrated in FIG. 5, the method for supplying coolant in a throttle body will be sequentially described.

First, when an engine begins to be operated, the temperature of coolant may be measured by receiving a sensor signal from a first temperature sensor installed on a coolant passage 110 in a heating adaptor 100 (S100).

Next, when the temperature of coolant is determined to be equal to or lower than a predetermined reference temperature (i.e. the coolant temperature at the time when the inner surface temperature of a throttle body increases above zero), the temperature of intake air may be measured by receiving a sensor signal from a second temperature sensor installed for measuring the temperature of intake air (S200).

In this case, when the temperature of intake air is determined to be equal to or lower than the predetermined reference temperature, a passage switching valve 200 for opening/closing the coolant passage 110 in the heating adaptor 100 may be controlled to be opened (S300).

That is, when the above condition is satisfied, the passage switching valve 200 may be controlled to be opened such that a coolant supply passage 220 and a coolant discharge passage 230 may be connected to the respective coolant introduction and discharge parts of the heating adaptor 100.

Finally, the signal indicative of opening of the passage switching valve 200 may be transferred to a drive unit 300 so that coolant may be circulated in the heating adaptor 100 and may be supplied to the coolant passage 110 (S400).

Meanwhile, when the temperature of coolant is determined to be equal to or higher than the predetermined reference temperature in the step of measuring the temperature of coolant (S100), the passage switching valve 200 for opening/closing the coolant passage in the heating adaptor 100 may be controlled to be closed (S110).

In other words, when the above condition is satisfied, the passage switching valve 200 may be controlled to be closed such that the inlet and outlet of a bypass passage 210 are connected to the respective coolant introduction and discharge parts of the heating adaptor 100.

Subsequently, the signal indicative of closing of the passage switching valve 200 may be transferred to the drive unit 300 and the drive unit 300 may slide the passage switching valve 200 such that the coolant supplied to the coolant passage 110 is bypassed along the bypass passage 210, thereby blocking the supply of coolant to the coolant passage 110 (S120).

In addition, when the temperature of intake air is determined to be equal to or higher than the predetermined reference temperature in the step of measuring the temperature of intake air (S200), the passage switching valve 200 may be controlled to be closed (S110), similar to when determining the temperature of coolant, thereby blocking the supply of coolant to the coolant passage 110 (S120).

In the case where the passage switching valve 200 is controlled to be opened or closed in the embodiment, the opening/closing of the passage switching valve 200 may be controlled by comparing the temperatures of coolant and intake air with the predetermined reference temperature. Therefore, it may be possible to block coolant from being supplied to the coolant passage 110 in advance, and to prevent the temperature of intake air passing through the throttle body from being increased within a short time.

The present disclosure can prevent the ignition timing from being delayed due to an increase in temperature of intake air passing through the throttle body, by supplying coolant to the coolant passage in the throttle body when the temperatures of coolant and intake air are equal to or lower than the predetermined reference temperature (i.e. the coolant temperature at the time when the inner surface temperature of the throttle body increases above zero), and by bypassing the supply of coolant thereto so as to block the supply of the coolant when the temperatures of coolant and intake air exceed the predetermined reference temperature.

In addition, the present disclosure can minimize an increase in manufacturing costs, by selectively blocking coolant from being supplied to the coolant passage in the throttle body depending on the temperatures of coolant and intake air, and by implementing coolant bypass valves into a single control valve.

As is apparent from the above description, the present disclosure can prevent an ignition timing from being delayed due to an increase in temperature of intake air passing through a throttle body, by supplying coolant to a coolant passage in the throttle body when the temperatures of coolant and intake air are equal to or lower than a predetermined reference temperature (i.e. the coolant temperature at the time when the inner surface temperature of the throttle body increases above zero), and by bypassing the supply of coolant thereto so as to block the supply of the coolant when the temperatures of coolant and intake air exceed the predetermined reference temperature.

In addition, the present disclosure can minimize an increase in manufacturing costs, by selectively blocking coolant from being supplied to the coolant passage in the throttle body depending on the temperatures of coolant and intake air, and by implementing coolant bypass valves into a single control valve.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for supplying a coolant in a throttle body, comprising:
    a heating adaptor having a coolant passage therein in which a coolant supplied thereto is circulated and discharged;
    a passage switching valve movably installed in a coupling hole provided at an inlet of the heating adaptor, and having a bypass passage in which the coolant circulated along the coolant passage is selectively blocked; and
    a drive unit connected to the passage switching valve for sliding the passage switching valve so that the coolant supplied to the heating adaptor is discharged along the bypass passage.

2. The apparatus of claim 1, wherein the passage switching valve comprises:

a coolant supply passage forming a circulation path in which the coolant supplied to the heating adaptor is circulated along the coolant passage in the heating adaptor; and a coolant discharge passage spaced apart from the coolant supply passage, and forming a discharge path in which the coolant circulated in the heating adaptor is discharged along the coolant passage.

3. The apparatus of claim 2, wherein a distance between an inlet and an outlet of the bypass passage is equal to a distance between the coolant supply passage and the coolant discharge passage, and the bypass passage allows the coolant supplied to the heating adaptor to be bypassed and discharged.

4. The apparatus of claim 2, wherein the bypass passage passes through the coolant discharge passage and is installed such that an inlet and an outlet thereof are connected to each other, and the inlet and the outlet of the bypass passage are connected to the coolant passage when the passage switching valve slides.

5. The apparatus of claim 1, further comprising a sealing member installed in a fastening groove formed in one end of the passage switching valve so as to offset a distance between an outer peripheral surface of the passage switching valve and an inner peripheral surface of the coupling hole.

* * * * *